March 1, 1966 G. W. BRANDEBERRY 3,237,294
METHOD OF REMOVING RUBBER SLEEVES FROM BUSHINGS
Filed March 13, 1963
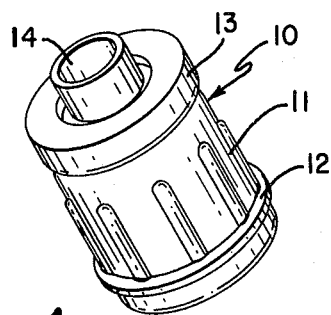
Fig.1
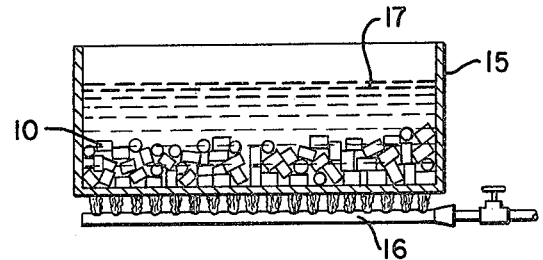
Fig.2
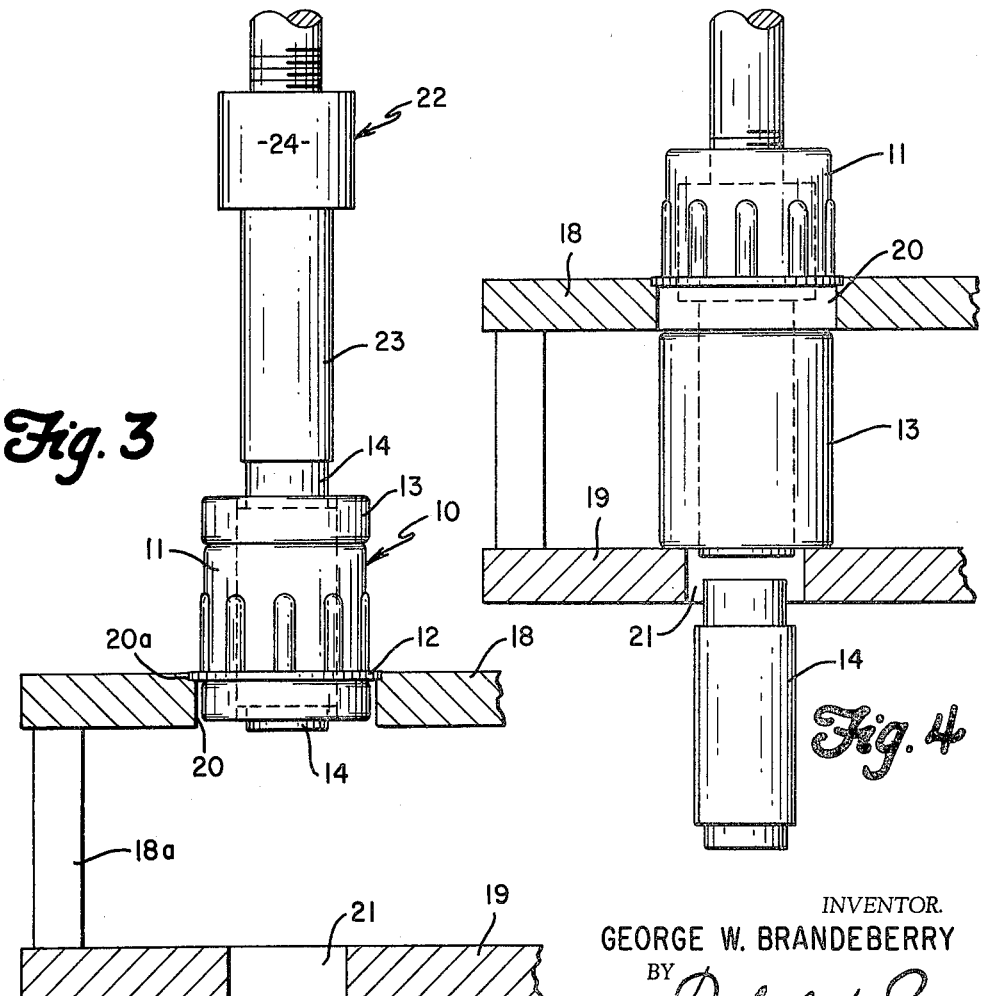
Fig.3
Fig.4
INVENTOR.
GEORGE W. BRANDEBERRY
BY
ATTORNEY

United States Patent Office 3,237,294
Patented Mar. 1, 1966

3,237,294
METHOD OF REMOVING RUBBER SLEEVES
FROM BUSHINGS
George W. Brandeberry, 1402 Freedom, Toledo, Ohio
Filed Mar. 13, 1963, Ser. No. 264,887
5 Claims. (Cl. 29—427)

This invention relates to a method of separating the tubular elastic rubber insert from the outer rigid sleeve and the inner rigid tubular core. Such assembly provides a resilient bushing and large quantities are used in automobiles, heavy machinery, etc. These parts are assembled under extremely high hydraulic pressures so that the rubber sleeve or insert is retained under quite high radial compression, pressures from ten to three hundred tons p.s.i. are not at all uncommon for this purpose. However, considerable difficulty has been encountered in the assembly of these parts and many of these bushings are so imperfect that they are discarded. One of the main diffifficulties has been achieving concentricity of the several parts, and, if that is not obtained, the bushing is useless to all intents and purposes. Thus a substantial percentage of these bushings are discarded and it becomes important to disassemble the discards, so that a new rubber insert can be applied to the other two components. Owing to the fact that the rubber insert has been pressed with tremendous force into position between the two rigid parts, the problem of separating them has been difficult of solution.

One method which has been employed for this purpose has involved the use of dry heat to liquefy the rubber and, although this has been effective in removing the rubber insert, nevertheless a small amount of rubber is found to adhere to one or both of the sleeve and core. This, even though small, is enough to affect adversely the concentricity of the parts when a new insert is forced between the other parts.

It is a desideratum to produce a simple, economical and practical method of removing rubber inserts from resilient bushings so that the sleeve and core are clean and free from specks of rubber so that those parts can be reused and receive a new rubber insert.

In the drawings,

FIGURE 1 is a perspective view of a resilient bushing;

FIGURE 2 is a longitudinal sectional view of tank into which the bushings are placed, the same being heated by a suitable burner;

FIGURE 3 is a view partly in section and partly in plan of die and punch parts for forcing the softened rubber insert from the rigid sleeve and core parts; and FIGURE 4 is a view similar to FIGURE 3 after the parts have been separated from each other.

Referring to the drawings, FIGURE 1 shows a resilient bushing 10 which is well known in the art and is used extensively, for example, in the automotive industry, but is also used in heavy machinery. These bushings vary considerably in size from a relatively small one to one of large size such, for example, as used in cranes and power shovels. The structure of these bushings is substantially the same and each consists of a rigid outer shell 11 which may be of relatively heavy gauge sheet metal, longitudinally ribbed for strength and having a lateral circular flange 12 at one end, which projects laterally a short distance. The opposite end of the shell may be slightly inwardly curved as indicated in order more intimately to engage the rubber insert, indicated at 13. The insert 13 is of elastic rubber and is in the form of an annulus of such length as to project substantially beyond opposite ends of the rigid shell 11. Disposed within the rubber annulus, or insert 13 is a rigid tubular core 14 which may also be of relatively heavy gauge sheet metal and, as shown, the ends of the core project outwardly beyond the adjacent ends of the rubber insert. The parts of the bushing are assembled in such manner that the rubber insert is radially compressed to a very high degree. These bushings are assembled usually by fluid pressure and in this connection reference is made to United States patent to Myers 2,877,543, dated March 17, 1959, which shows and describes a machine for assembling these bushings.

Manifestly, in assembling these parts where the elastic rubber insert 13 is deformed or compressed radially to a very substantial degree, difficulties occur in having the proper concentricity maintained between the several parts and, if that is not maintained, the bushing is unsatisfactory and is discarded. As a consequence, it is found that a substantial percentage of these bushings are discarded by the manufacturer, and this invention is concerned with the recovery, particularly, of the outer shell 11 and core 14 so that in a subsequent operation a new elastic rubber insert 13 may be applied.

As shown, the discarded resilient bushings 10 are placed within a tank 15 which is heated, as indicated, by a burner 16. The tank contains a quantity of either vegetable or mineral oil which is heated from about 440° F. to about 475° F. The bushings remain in the tank for a period from about 20 minutes to an hour and a half, depending upon the size of the bushing, the larger the bushing the greater period of time being required for softening the rubber of the insert 13. It should be appreciated that these bushings vary from about three ounces to approximately 250 pounds, so that the time required to soften the rubber would vary due to the difference in size of the elastic rubber insert 13. Inasmuch as rubber will liquefy at around 475° F., it is important that the temperature of the oil 17 be kept below that degree of temperature. In accordance with this invention it is not desired that the rubber become liquefied. The intent is to soften the rubber but not liquefy it. It will further be understood that the oil 17 may be maintained at a substantially lower temperature but in such event a considerably longer period of time is required to soften the rubber. That, of course, is uneconomical so that the desired temperature of the oil 17 will be empirically established.

After the rubber inserts 13 are properly softened they are individually delivered to a die assembly which has an upper die plate 18 and a lower die plate 19, which are maintained in separated relationship in any suitable manner such as by spacer pins 18a. The spacing should be such as about to equal the length of the rubber insert 13. The die plate 18 is formed with a hole 20, the upper edge portion of which is recessed at 20a, to receive the flange 12 of the outer shell 11. Axially aligned with the hole 20 is a hole 21 in the die plate 19. The hole 21 is of smaller diameter than that of the rubber insert 13 but of slightly greater diameter than the tubular core 14.

As indicated on FIGURE 3, a bushing 10 is placed in upright position with the flange 12 resting in the recess. Then a fluid operated plunger 22 is advanced so that the elongate nose portion 23 engages the tubular core 14. As shown, the nose portion 23 is of slightly greater diameter than that of the core 14 but of less diameter than the hole in the rubber insert 13.

By advancing the plunger, the core 14 is forced to free from the rubber insert 13. Sometimes it happens that the rubber insert 13 will move right along with the core 14 but in any event the core 14 is forced downwardly and may drop through the hole 21 in the die plate 19. On the other hand, the rubber insert 13 may move along with it until the latter engages the upper face of the die plate 19 as shown on FIGURE 4. Continued movement of the plunger 22 will push the core 14 downwardly through the hole 21. At the upper end of the plunger 22 is an enlarged portion 24 which provides a shoulder of a size to pass through the outer shell 11 and can engage the upper end of the insert 13 and force the same to the position shown on FIGURE 4 so that it is free of the rigid outer shell 11.

From the above it will be manifest that I have produced an exceedingly simple and inexpensive method and apparatus for removing the rubber inserts from the outer shell and core of resilient bushings. The operation can go forward rapidly and in each case it is found that the outer surface of the core 14 and the inner surface of the shell 11 are entirely free from specks of rubber and are clean so that a new rubber insert can be applied. Thus the shell and core of the resilient bushing are reclaimed and in good condition for reuse. Manifestly, the operation is inexpensive and has proved empirically to achieve the result in an entirely satisfactory manner.

Numerous changes because of construction, arrangement and operation may be effected without departing from the spirit of the invention, especially as defined in the appended claims.

What I claim is:

1. The method of disassembling a resilient bushing having a tubular elastic rubber insert retained under radial compression between an outer rigid sleeve and an inner rigid tubular core, said method consisting in heating the bushing in an oil bath at a temperature of about 450° F. for a period of time sufficient to soften the rubber, and thereafter separating the insert from the sleeve and core.

2. The method as claimed in claim 1 in which the temperature of the oil bath is between 440° F. and 475° F.

3. The method as claimed in claim 1 in which the oil bath is maintained below 475° F.

4. The method as claimed in claim 1 in which the bushing is kept in the oil bath for a period from about twenty minutes to one hour and a half depending upon the bushing size.

5. The method as claimed in claim 1 in which the insert is separated from the sleeve and core by the application of fluid pressure.

References Cited by the Examiner
UNITED STATES PATENTS

| | | | |
|---|---|---|---|
| 1,472,833 | 11/1923 | Herold | 29—427 |
| 1,707,640 | 4/1929 | Pade | 29—235 |
| 1,883,662 | 10/1932 | Fisher | 29—427 |
| 2,686,091 | 8/1954 | Young | 156—344 XR |
| 3,061,915 | 11/1962 | Puryear | 29—235 |

CHARLIE T. MOON, *Primary Examiner.*

WHITMORE A. WILTZ, *Examiner.*